F. POTTER & W. WEBB.
BUCKETS OR VALVES FOR CHAIN PUMPS.

No. 181,202. Patented Aug. 15, 1876.

Witnesses.
James M. Vincent
Geo. P. Marion

Frederick Potter
by E. Thurlow his atty in fact
William Webb
by E. Thurlow his atty in fact

UNITED STATES PATENT OFFICE.

FREDERICK POTTER AND WILLIAM WEBB, OF BEARDSTOWN, ILLINOIS.

IMPROVEMENT IN BUCKETS OR VALVES FOR CHAIN-PUMPS.

Specification forming part of Letters Patent No. 181,202, dated August 15, 1876; application filed July 3, 1876.

*To all whom it may concern:*

Be it known that we, FREDERICK POTTER and WILLIAM WEBB, of Beardstown, in the county of Cass, in the State of Illinois, have invented an Improvement in Buckets or Valves for Chain-Pumps; and do hereby declare that the following is a full, clear, and exact description thereof, reference being had to the annexed drawings, making a part of this specification, in which like letters of reference refer to like parts, and in which—

Figure 1:
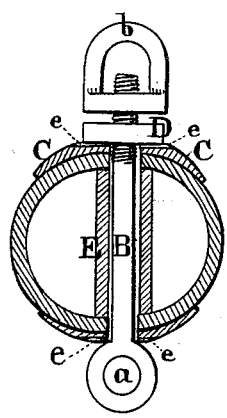
Figure 2:
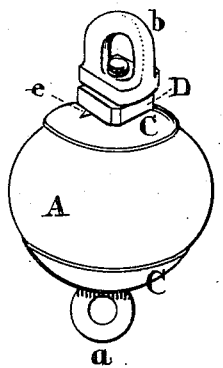
Figure 3:
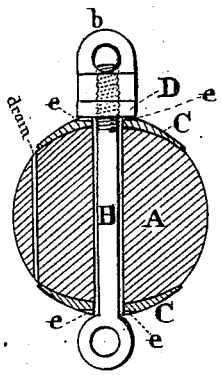

Figure 1 represents a central section along the stem or axis; Fig. 2, a perspective view; Fig. 3, another form of valve.

This invention consists in a spheroidal elastic ball or bucket, solid or hollow, with or without a drain passage or tube passing through it, compressible, to remedy circumferential wear against the well-tube, by means of a nut upon the thread of a central bolt or stem, and basin-shaped washers on either side of the ball. The drain-passage may be made down the stem, through the ball itself, or down a tube inclosing the bolt or stem, to which access of water may be made by means of small ducts or grooves under the nut along the washer, and a notch or enlargement of the bolt-hole.

In the drawings, which represent one of the forms in which we construct this bucket, A represents a hollow elastic ball, preferably of rubber, large enough to fill the well-tube, and perforated vertically by a stem or bolt, B, having at one end a ring, *a*, for the attachment of the usual chain, and a thread, *f*, to receive a nut, D, and a second ring or eye and nut, *b*. C C are concave washers encircling the bolt B, at either end, next to the ball A. These are each provided with a notch or slit, *e*, on the surface, and in the central opening, to lead off water to or from the central drain E, which is either a solid or an elastic tube, encircling the bolt B, and terminating at either end at the openings in the respective washers C C. In the use of a solid rubber ball we make the same with a drain through the substance nearer its equator, or on the outside of the washers, or through the axis of the ball.

The operation of this bucket is as follows: On the appearance of wear upon the circumference of the ball A by friction against the well-tubing, the nut D is turned, so as to compress the ball between the washers C C. The tube E prevents water from standing long above the ball, and conducts it downward, by means of the auxiliary groove *e* in the washers, so preventing the freezing of the ball to the well-tube, or the tube may be dispensed with by allowing the water to drain through the ball itself, finding inlet and outlets in the grooves *e e*.

What we claim as our invention is—

1. The basin-shaped washers C C, each with drain *e* leading to a central tube, E, in combination with ball A and its contained elastic tube E, as and for the purposes described.

2. The combination of the basin-shaped compresses C C, provided with drains *e*, and ball A, as described.

3. The bucket A B C D E, constructed and arranged as described, with elastic tube E, in combination with the elastic ball A, the two latter working together to allow the ball to compensate for exterior wear against the tubing, by means of usual nuts and bolt, as described.

In testimony that we claim the foregoing improvement in buckets for pumps we have hereunto set our hands this 15th day of June, A. D. 1876.

FREDERICK POTTER.
                WILLIAM WEBB.

Witnesses:
   R. B. FULKS,
   CHAS. F. NORTON.